(12) United States Patent
Chiong et al.

(10) Patent No.: US 9,938,379 B2
(45) Date of Patent: *Apr. 10, 2018

(54) SALT BYPRODUCT SEPARATION DURING FORMATION OF POLYARYLENE SULFIDE

(71) Applicant: Ticona LLC, Florence, KY (US)

(72) Inventors: Hendrich Chiong, Cincinnati, OH (US); Michael Haubs, Bad Kreuznach (DE); Damian Feord, Strasbourg (FR); Mark Shatzer, Cincinnati, OH (US); Jacob Grayson, Union, KY (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,884

(22) Filed: Aug. 1, 2016

(65) Prior Publication Data

US 2017/0009018 A1    Jan. 12, 2017

Related U.S. Application Data

(63) Continuation of application No. 14/481,199, filed on Sep. 9, 2014, now Pat. No. 9,403,948.

(Continued)

(51) Int. Cl.
*C08G 75/16* (2006.01)
*C08G 75/14* (2006.01)
(Continued)

(52) U.S. Cl.
CPC .............. *C08G 75/14* (2013.01); *B01J 19/24* (2013.01); *B01J 19/245* (2013.01); *C08G 75/16* (2013.01);
(Continued)

(58) Field of Classification Search
CPC ...................................................... C08G 75/16
(Continued)

(56) References Cited

U.S. PATENT DOCUMENTS 3,869,433 A    3/1975    Campbell
4,038,259 A    7/1977    Campbell et al.
(Continued)

FOREIGN PATENT DOCUMENTS

EP    2 322 485 A1    5/2011
JP    H07228699    8/1995
(Continued)

OTHER PUBLICATIONS

International Patent Application No. PCT/US2014/54724; International Search Report and Written Opinion dated Dec. 8, 2015; (6 pages).

*Primary Examiner* — Duc Truong
(74) *Attorney, Agent, or Firm* — Dority & Manning, P.A.

(57) ABSTRACT

Methods of forming a polyarylene sulfide and systems as may be utilized in carrying out the methods are described. Included in the formation method is a filtration process for treatment of a mixture, the mixture including a polyarylene sulfide, a salt byproduct of the polyarylene sulfide formation reaction, and a solvent. The filtration process includes maintaining the downstream side of the filter medium at an increased pressure. The downstream pressure can such that the boiling temperature of the mixture at the downstream pressure can be higher than the temperature at which the polyarylene sulfide is insoluble in the solvent.

12 Claims, 2 Drawing Sheets

Related U.S. Application Data (60) Provisional application No. 61/882,332, filed on Sep. 25, 2013, provisional application No. 62/033,289, filed on Aug. 5, 2014.

(51) Int. Cl.
  *B01J 19/24* (2006.01)
  *C08J 3/20* (2006.01)

(52) U.S. Cl.
  CPC ...... *C08J 3/203* (2013.01); *B01J 2219/00736* (2013.01); *B01J 2219/00759* (2013.01); *B01J 2219/24* (2013.01); *C08J 2381/04* (2013.01)

(58) Field of Classification Search
  USPC .......... 528/388, 373; 524/609; 422/131, 134
  See application file for complete search history.

(56) References Cited

U.S. PATENT DOCUMENTS

| | | |
|---|---|---|
| 4,038,260 A | 7/1977 | Campbell |
| 4,038,262 A | 7/1977 | Edmonds, Jr. |
| 4,038,263 A | 7/1977 | Edmonds, Jr. et al. |
| 4,039,518 A | 8/1977 | Campbell |
| 4,056,515 A | 11/1977 | Vidaurri, Jr. |
| 4,060,520 A | 11/1977 | Irvin |
| 4,064,114 A | 12/1977 | Edmonds, Jr. |
| 4,089,847 A | 5/1978 | Edmonds, Jr. et al. |
| 4,096,132 A | 6/1978 | Edmonds, Jr. |
| 4,370,470 A | 1/1983 | Vidaurri et al. |
| 4,393,197 A | 7/1983 | Edmonds, Jr. |
| 4,451,640 A | 5/1984 | Shiiki et al. |
| 4,457,812 A | 7/1984 | Rado |
| 4,495,332 A | 1/1985 | Shiiki et al. |
| 4,501,902 A | 2/1985 | Cleary |
| 4,514,558 A | 4/1985 | Shiiki et al. |
| 4,537,953 A | 8/1985 | Kawakami et al. |
| 4,613,654 A | 9/1986 | Katto et al. |
| 4,645,826 A | 2/1987 | Iizuka et al. |
| 4,699,975 A | 10/1987 | Katto et al. |
| 4,745,167 A | 5/1988 | Iizuka et al. |
| 4,761,468 A | 8/1988 | Okamoto et al. |
| 4,767,841 A | 8/1988 | Goetz et al. |
| 4,769,442 A | 9/1988 | Iwasaki et al. |
| 4,786,711 A | 11/1988 | Senatore et al. |
| 4,794,164 A | 12/1988 | Iwasaki et al. |
| 4,812,539 A | 3/1989 | Iizuka et al. |
| 4,814,430 A | 3/1989 | Iwasaki et al. |
| 4,820,800 A | 4/1989 | Geibel et al. |
| 4,841,019 A | 6/1989 | Iwasaki et al. |
| 4,931,516 A | 6/1990 | Iizuka et al. |
| 4,976,825 A | 12/1990 | Iwasaki et al. |
| 5,015,725 A | 5/1991 | Scoggins et al. |
| 5,023,315 A | 6/1991 | Ceurvorst et al. |
| 5,037,954 A | 8/1991 | Nesheiwat et al. |
| 5,086,163 A | 2/1992 | Scoggins et al. |
| 5,110,902 A | 5/1992 | Scoggins et al. |
| 5,126,430 A | 6/1992 | Senga et al. |
| 5,179,194 A | 1/1993 | Kawakami et al. |
| 5,194,580 A | 3/1993 | Koyama et al. |
| 5,235,032 A | 8/1993 | Geibel et al. |
| 5,241,043 A | 8/1993 | Senga |
| 5,278,283 A | 1/1994 | Miyoshi et al. |
| 5,280,104 A | 1/1994 | Geibel et al. |
| 5,296,579 A | 3/1994 | Geibel et al. |
| 5,314,972 A | 5/1994 | Nesheiwat et al. |
| 5,342,920 A | 8/1994 | Imai et al. |
| 5,350,833 A | 9/1994 | Inoue et al. |
| 5,352,768 A | 10/1994 | Stuber et al. |
| 5,354,841 A | 10/1994 | Geibel et al. |
| 5,364,928 A | 11/1994 | Ash |
| 5,438,115 A | 8/1995 | Fahey et al. |
| 5,440,009 A | 8/1995 | Ash et al. |
| 5,635,587 A | 6/1997 | Koyama et al. |
| 5,688,908 A | 11/1997 | Haubs et al. |
| 5,744,576 A | 4/1998 | Miyahara et al. |
| 5,756,654 A | 5/1998 | Sase et al. |
| 5,777,069 A | 7/1998 | Tsuda et al. |
| 5,789,533 A | 8/1998 | Yamanaka et al. |
| 5,804,076 A | 9/1998 | Yamasaki et al. |
| 5,840,830 A | 11/1998 | Miyahara et al. |
| 5,856,433 A | 1/1999 | Koyama et al. |
| 5,898,061 A | 4/1999 | Sase et al. |
| 5,929,203 A | 7/1999 | Ash et al. |
| 6,001,934 A | 12/1999 | Yamanaka et al. |
| 6,201,097 B1 | 3/2001 | Geibel et al. |
| 6,242,501 B1 | 6/2001 | Green et al. |
| 6,281,326 B1 | 8/2001 | Ash et al. |
| 6,331,608 B1 | 12/2001 | Vidaurri et al. |
| 6,337,062 B1 | 1/2002 | Akiba |
| 6,562,900 B2 | 5/2003 | Okamoto et al. |
| 6,600,009 B2 | 7/2003 | Inoue et al. |
| 6,646,105 B2 | 11/2003 | Shirota |
| 6,653,437 B2 | 11/2003 | Hinokimori et al. |
| 6,743,890 B2 | 6/2004 | Bando |
| 6,750,319 B2 | 6/2004 | Koyama |
| 6,939,942 B2 | 9/2005 | Shirota |
| 6,982,312 B2 | 1/2006 | Senga et al. |
| 7,018,574 B2 | 3/2006 | Koyama |
| 7,026,439 B2 | 4/2006 | Senga et al. |
| 7,094,867 B2 | 8/2006 | Miyahara et al. |
| 7,115,704 B2 | 10/2006 | Horiuchi et al. |
| 7,220,817 B2 | 5/2007 | Matsuzaki et al. |
| 7,312,300 B2 | 12/2007 | Mitchell |
| 7,317,072 B2 | 1/2008 | Senga et al. |
| 7,432,339 B2 | 10/2008 | Mitchell |
| 7,504,476 B2 | 3/2009 | Kawama et al. |
| 7,517,946 B2 | 4/2009 | Sato et al. |
| 7,569,656 B2 | 8/2009 | Kagoshima et al. |
| 7,632,915 B2 | 12/2009 | Sato et al. |
| 7,655,748 B2 | 2/2010 | Sato et al. |
| 7,754,848 B2 | 7/2010 | Sato et al. |
| 7,767,783 B2 | 8/2010 | Kawama et al. |
| 7,834,133 B2 | 11/2010 | Suzuki et al. |
| 8,076,447 B2 | 12/2011 | Sato et al. |
| 8,138,302 B2 | 3/2012 | Sato et al. |
| 8,183,336 B2 | 5/2012 | Sato et al. |
| 8,211,997 B2 | 7/2012 | Matsuzaki et al. |
| 8,263,734 B2 | 9/2012 | Fodor et al. |
| 8,426,552 B2 | 4/2013 | Hinokimori et al. |
| 8,445,629 B2 | 5/2013 | Hinokimori et al. |
| 8,530,605 B2 | 9/2013 | Konno et al. |
| 8,546,518 B2 | 10/2013 | Unohara et al. |
| 8,680,230 B2 | 3/2014 | Konno et al. |
| 9,403,948 B2 * | 8/2016 | Chiong ................. C08G 75/16 |
| 2003/0150804 A1 | 8/2003 | Haubs et al. |
| 2004/0249118 A1 | 12/2004 | Kagoshima et al. |
| 2005/0171332 A1 | 8/2005 | Koyama |
| 2006/0084785 A1 | 4/2006 | Sato et al. |
| 2010/0137531 A1 | 6/2010 | Horiuchi |
| 2010/0163499 A1 | 7/2010 | Odueyungbo |
| 2010/0210813 A1 | 8/2010 | Foder et al. |
| 2010/0228003 A1 | 9/2010 | Hinokimori et al. |
| 2010/0234559 A1 | 9/2010 | Sato et al. |
| 2011/0124825 A1 | 5/2011 | Konno et al. |
| 2011/0178268 A1 | 7/2011 | Suzuki et al. |
| 2011/0319587 A1 | 12/2011 | Hinokimori |
| 2012/0165501 A1 | 6/2012 | Kaiho et al. |
| 2012/0322972 A1 | 12/2012 | Koizumi et al. |
| 2012/0329984 A1 | 12/2012 | Kim et al. |
| 2013/0022808 A1 | 1/2013 | Taniguchi et al. |
| 2013/0065054 A1 | 3/2013 | Ichinose et al. |
| 2013/0068256 A1 | 3/2013 | Kobayashi et al. |
| 2013/0116401 A1 | 5/2013 | Kimura et al. |
| 2013/0253147 A1 | 9/2013 | Ichinose et al. |
| 2014/0128568 A1 | 5/2014 | Hinokimori |
| 2015/0065664 A1 | 3/2015 | Konno et al. |

FOREIGN PATENT DOCUMENTS

| | | |
|---|---|---|
| JP | H07242746 | 9/1995 |
| JP | H07292107 | 11/1995 |
| JP | H07316428 | 12/1995 |
| JP | H07330911 | 12/1995 |

(56) References Cited

FOREIGN PATENT DOCUMENTS

| | | |
|---|---|---|
| JP | H0820644 | 1/1996 |
| JP | H0820645 | 1/1996 |
| JP | H08100064 | 4/1996 |
| JP | H08118502 | 5/1996 |
| JP | H08118503 | 5/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |
| JP | H08283413 | 10/1996 |
| JP | H08319348 | 12/1996 |
| JP | H0967439 | 3/1997 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |
| WO | WO 2013/061561 A1 | 5/2013 |
| WO | WO 2013/0147141 | 10/2013 |

* cited by examiner

FIG. 3

SALT BYPRODUCT SEPARATION DURING FORMATION OF POLYARYLENE SULFIDE

CROSS REFERENCE TO RELATED APPLICATIONS

The present application is a continuation of U.S. application Ser. No. 14/481,199, filed on Sep. 9, 2014 now U.S. Pat. No. 9,403,948, which claims filing benefit of U.S. Provisional Patent application 61/882,332, having a filing date of Sep. 25, 2013; and U.S. Provisional Patent application 62/033,289 having a filing date of Aug. 5, 2014; all of which are incorporated herein by reference in their entirety.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of a dihaloaromatic compound with an alkali metal sulfide or an alkali metal hydrosulfide in an organic amide solvent. Salts are formed as byproducts in the polymerization reaction, and these salt byproducts must be removed to obtain a final product exhibiting desirable traits.

Standard methods for removal of salt byproducts have included the utilization of screens or sieves that rely on a difference in particle size between the polyarylene sulfide and the salt byproduct. Unfortunately, these methods have proven less than ideal due to loss of product in the form of polyarylene sulfide fines as well as undesirable levels of salt byproduct remaining trapped in the product polyarylene sulfide granules. Water extraction has been utilized in an attempt to remove salt remaining after the screening/sieving operation, but this adds an additional step as well as associated costs to the to the formation process and does not solve the problem of the loss of polyarylene sulfide fines during the screening/sieving operation.

Solid/liquid extraction processes have also been utilized to remove salt byproducts from the polymerization product. While fairly effective, extraction methods require a large amount of water and thus create both waste and additional operational costs. Other separation processes such as flashing of solvent followed by sieving and/or water extraction have been utilized, but these methods, similar to others, add costs, additional process steps, and undesirable waste to the formation process.

What is needed in the art is a method for removal of salt byproducts during formation of a polyarylene sulfide polymer that can keep capital costs low and avoid the formation of additional waste.

SUMMARY OF THE INVENTION

A method of forming a polyarylene sulfide polymer is disclosed. For instance, a method can include reacting a dihaloaromatic compound and an alkali metal sulfide or an alkali metal hydrosulfide in an organic amide solvent to form a polyarylene sulfide polymer and a salt. A mixture including the polyarylene sulfide, the salt, and the organic amide solvent can then be subjected to a filtration process. In the filtration process, the mixture flows to a filter medium from upstream and a filtrate flows away from the filter medium downstream while the salt is retained at the filter medium and forms a salt cake. The downstream pressure of the filtration process can be greater than atmospheric pressure and the boiling temperature of the mixture at the downstream pressure can be greater than the minimum temperature at which the polyarylene sulfide is fully soluble in the solvent. The downstream pressure thus serves to maintain the polymer in solution during the filtration and the filtration can be carried out in a temperature range that is less than the boiling temperature of the mixture at the downstream pressure and greater than the minimum temperature at which the polyarylene sulfide is fully soluble in the solvent.

In one embodiment, the reaction can be a first stage polymerization reaction of a multi-stage polyarylene sulfide formation process and the polyarylene sulfide can be of relatively low molecular weight at the filtration. In this embodiment the method can also include a second stage polymerization reaction during which the molecular weight of the polyarylene sulfide can be increased.

BRIEF DESCRIPTION OF THE FIGURES

The present disclosure may be better understood with reference to the following figures.

DETAILED DESCRIPTION

It is to be understood by one of ordinary skill in the art that the present discussion is a description of exemplary embodiments only, and is not intended as limiting the broader aspects of the present invention.

The present disclosure is generally directed to methods of forming a polyarylene sulfide and systems as may be utilized in carrying out the methods. More specifically, disclosed is a filtration process for treatment of a mixture, the mixture including a polyarylene sulfide, a salt byproduct of the polyarylene sulfide formation reaction, and a solvent. The filtration process includes maintaining the downstream side of the filter medium at an increased pressure. The downstream pressure can such that the boiling temperature of the mixture at the downstream pressure can be greater than the minimum temperature at which the polyarylene sulfide is fully soluble in the solvent. The filtration can be carried out within a temperature range between the boiling temperature of the mixture and the temperature at which the polymer is fully soluble in the solvent. The downstream pressure thus serves to maintain the polymer in solution during the filtration.

During the filtration process, the pressure differential across the filter medium can be static or can vary throughout the process. In any case, the pressure differential across the filter medium can be controlled so as to ensure that the filtration process can proceed at a reasonable rate. The filtration process can remove salt byproduct from the mixture according to a simple, fast, and reliable method that can utilize existing filtration equipment technology at lower capital costs. In addition, the method can utilize less solvent in a final wash of the polyarylene sulfide, which can reduce waste produced during the polyarylene sulfide formation process.

Through utilization of the filtration process, most or all of the salt byproduct formed during the polymerization reaction can be removed with little or no precipitation of the polyarylene sulfide within the filtration unit. Thus, the filtration process can lead to longer filter life and less production downtime as well as a decrease in waste production as waste-generating extraction operations necessary in the past can be decreased or eliminated. Moreover, the method can eliminate the need for a sieving process that relies on size differential between the polyarylene sulfide granules and the salt byproduct.

According to one embodiment, the filtration process can be carried out following a polymerization reaction during which the polyarylene sulfide that is formed is a relatively low molecular weight prepolymer and prior to a second stage polymerization reaction during which the molecular weight of the polyarylene sulfide is increased to reach a commercially useful value. By separating the salt byproduct prior to a second stage polymerization reaction, further improvements in a formation process can be realized, including an increase in the reaction rate of the second stage reaction as a lower solvent to sulfur ratio may be used in the second stage, effectively increasing the polymer concentration and formation rate. In addition, by carrying out the salt separation process prior to the second stage polymerization reaction, the capacity of the reactor for the second stage can be increased due to removal of the salt from the mixture to be charged to a second stage reactor.

This is not a requirement of the filtration process, however, and in other embodiments the filtration process can be carried out following a polymerization reaction during which the polyarylene sulfide that is formed is a higher molecular weight polymer. For instance, the filtration process can be carried out following a single polymerization process or following a second (or subsequent) polymerization stage in a multi-stage polymerization process.

Figure 1:
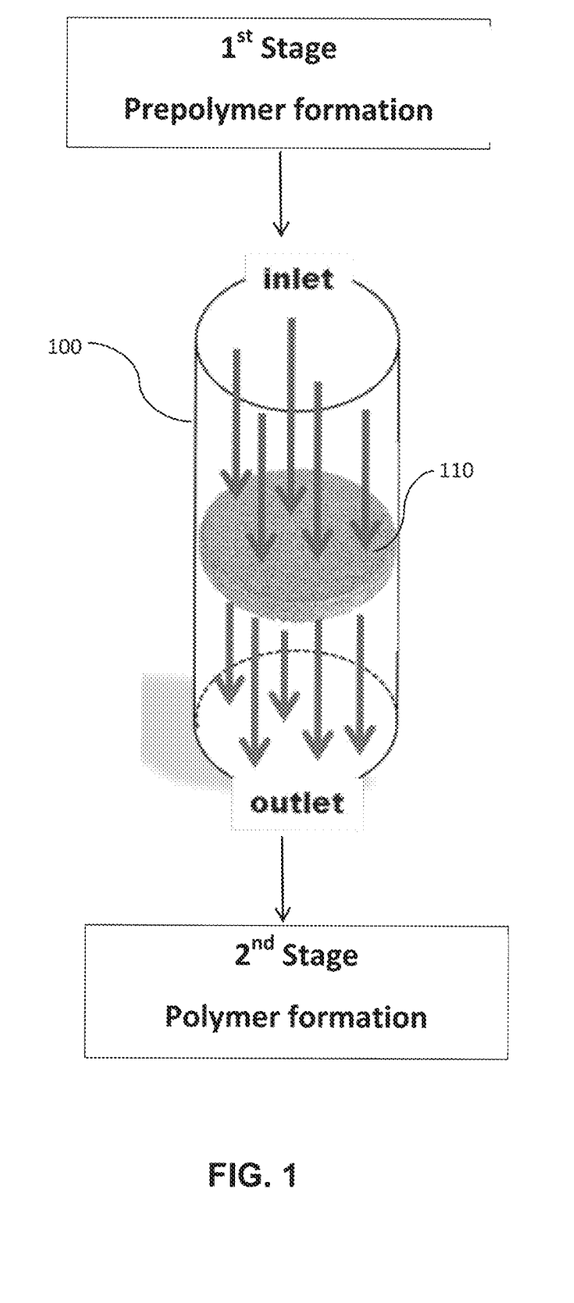
FIG. 1 is a flow diagram for a polyarylene sulfide formation process including a salt byproduct separation process as described herein.

The formation process for producing the polyarylene sulfide can include reacting a compound that provides a hydrosulfide ion, e.g., an alkali metal sulfide or an alkali metal hydrosulfide, with a dihaloaromatic compound in an organic amide solvent. One embodiment for forming the polyarylene sulfide is illustrated in FIG. 1. According to this embodiment, a first stage polymerization reaction can be carried out in which monomers are reacted in the first stage to form a polyarylene sulfide prepolymer of relatively low molecular weight.

In general, a polyarylene sulfide as may be formed according to the process can be a polyarylene thioether containing repeat units of the formula (I):

(I)

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide can typically include more than about 30 mol %, more than about 50 mol %, or more than about 70 mol % arylene sulfide (—AR—S—) units. In one embodiment the polyarylene sulfide includes at least 85 mol % sulfide linkages attached directly to two aromatic rings.

In one embodiment, the polyarylene sulfide formed by the process can be a polyphenylene sulfide, defined herein as containing the phenylene sulfide structure —$(C_6H_4$—$S)_n$— (wherein n is an integer of 1 or more) as a component thereof.

The monomers utilized in forming the polyarylene sulfide can include an alkali metal sulfide that can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

A dihaloaromatic compound can be charged to the first stage polymerization reaction in conjunction with the alkali metal sulfide. A dihaloaromatic monomer can be, without limitation, o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom of the dihaloaromatic compound can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of 2 or more compounds thereof is used as the dihaloaromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic monomers, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

(II)

and segments having the structure of formula (III):

(III)

or segments having the structure of formula (IV):

(IV)

In general, the amount of the dihaloaromatic compound(s) per mole of the effective amount of the charged alkali metal sulfide can be from 1.0 to 2.0 moles, from 1.05 to 2.0 moles, or from 1.1 to 1.7 moles. Thus, the polyarylene sulfide can include alkyl halide (e.g., alkyl chloride) end groups.

In another embodiment, a copolymer can be formed and a monomer can be charged to the system having the formula (V):

(V)

where the radicals $R^1$ and $R^2$, independently of one another, are a hydrogen, fluorine, chlorine or bromine atom or a branched or unbranched alkyl or alkoxy radical having from 1 to 6 carbon atoms. In one embodiment, a monomer of formula (V) can be p-hydroxybenzoic acid or one of its derivatives

Another monomer as may be charged to the system can have a structure of the formula (VI):

(VI)

One example of a monomer of formula (VI) is 2-hydroxynaphthalene-6-carboxylic acid. Monomers of the formula V and VI may be both charged to the system to form a polyarylene sulfide copolymer.

A polyarylene sulfide copolymer can include a segment derived from a polyarylene sulfide structure of the formula (VII):

(VII)

where Ar is an aromatic radical, or more than one condensed aromatic radical, and q is a number from 2 to 100, in particular from 5 to 20. The radical Ar in formula (VII) may be a phenylene or naphthylene radical. In one embodiment, the second segment may be derived from poly(m-thiophenylene), from poly(o-thiophenylene), or from poly(p-thiophenylene).

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be formed that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear starting polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Exemplary organic amide solvents used in a forming the polyarylene sulfide can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

During an initial stage of the polymerization, a complex including an alkali metal organic amine and an alkali metal hydrogen sulfide can be formed by combining a pre-determined amount of an organic amide solvent with an alkali metal sulfide, an alkali metal hydroxide, and water. For example, a complex of sodium methylaminobutyrate (SMAB) and sodium hydrogen sulfide (NaSH) can be formed by combining a pre-determined amount of alkali sulfide salt, N-methylpyrrolidone (NMP), water and sodium hydroxide to form a mixture. The mixture can be subjected to heating until the temperature of the mixture has reached from about 200° C. to about 210° C. During this reaction, a combination of water, NMP and some H$_2$S can be collected as a distillate. The distillate can be analyzed, e.g., by chromatography, to determine the composition of the mixture during the first stage of polymerization.

When carrying out this stage of the polymerization reaction, the alkali metal sulfide, which usually includes water, can be charged into the organic amide solvent and the mixture can be heated to distill the excessive water out of the reaction system. At that time, a part of the alkali metal sulfide will decompose to form an alkali and hydrogen sulfide (H$_2$S). From the generated amount of H$_2$S, the effective amount of the charged alkali metal sulfide can be calculated.

The termination of this initial stage of the polymerization reaction during which the complex is formed is generally that point at which the conversion rate of the dihaloaromatic compound in the reaction system reaches not less than about 50 mol %, not less than about 70 mol %, or not less than about 90 mol % of the theoretical conversion. The theoretical conversion of the dihaloaromatic compound can be calculated from one of the following formulas:

(a) In the case wherein the dihaloaromatic compound has been added in excess (by molar ratio) of the alkali metal sulfide:

$$\text{Conversion rate} = \frac{X - Y}{X - Z} \times 100$$

(b) In the cases other than (a):

$$\text{Conversion rate} = \frac{X - Y}{X} \times 100$$

wherein X is the amount of the charged dihaloaromatic monomer; Y is the remaining amount of the dihaloaromatic monomer and Z is the excessive amount of dihaloaromatic monomer in moles.

(c) In the case other than (a) or (b)

$$\text{Conversion rate} = A/B * 100$$

Wherein A is the total weight of salt collected after removal of the residual polymer and other species other than salt by-product; B is the theoretical weight of salt which is two times the molar amount of the effective sulfide present during the polymerization.

Following formation of the complex, a mixture including the complex is reacted with a dihaloaromatic monomer, for example at a temperature of from about 180° C. to about 280° C., or from about 200° C. to about 260° C., and the low molecular weight prepolymer can be formed. This initial polymerization can continue until the conversion rate of the dihaloaromatic compound attains to not less than about 50 mol % of the theoretically necessary amount.

Following this polymerization reaction, the mean molar mass of the prepolymer as expressed by the weight average molecular weight, $M_w$, can be from about 500 g/mol to about 30,000 g/mol, from about 1000 g/mol to about 20,000 g/mol, or from about 2000 g/mol to about 15,000 g/mol.

The polymerization reaction apparatus is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc.

Following the polymerization reaction and formation of the low molecular weight prepolymer, the mixture can include the prepolymer, the solvent, and one or more salts. For instance, the molar ratio of the solvent to sulfide can be from about 1 to about 10, or from about 2 to about 5. The proportion by volume of salt formed as a byproduct to the reaction can be from about 0.05 to about 0.25, or from about 0.1 to about 0.2.

Salts included in the reaction mixture can include those formed as a byproduct during the reaction as well as salts added to the reaction mixture, for instance as a reaction promoter. The salts can be organic or inorganic, i.e. can consist of any combination of organic or inorganic cations with organic or inorganic anions. They can be at least partially insoluble in the reaction medium and have a density different from that of the liquid reaction mixture. Typical representatives of the inorganic salts are the halides of alkali or alkaline earth metals which can be formed as byproduct of the polymerization reaction(s). Representatives of organic salts can include carboxylates of the alkali metals, of the alkaline earth metals, of ammonium or of organically substituted ammonium cations which can be used as promoters in the preparation of the polyarylene sulfide. As utilized herein, carboxylates refer to the solids of aliphatic carboxylic acids, e.g. acetic acid or propionic acid, or aromatic carboxylic acids, for example benzoic acid, and also solids of polyfunctional carboxylic acids.

Precipitation of polyarylene sulfide often occurs at atmospheric pressure at temperatures of about 220° C. to about 230° C. for mixtures having a solids content of between about 20 wt. % and about 30 wt. %, which is typical for a polyarylene sulfide prepolymer formation. While the boiling temperature of the solvent can vary, it is often in the range of from about 200° C. to about 220° C. For instance, the boiling temperature of N-methyl-2-pyrrolidone is about 202° C. at atmospheric pressure. When conditions are such that the boiling temperature of the mixture is less than the minimum temperature at which the polyarylene sulfide is fully soluble in the solvent, precipitation of the polymer can occur at a temperature between these two temperatures. This can occur for any solvent-containing mixture that includes the polymer. However, the boiling temperature of the mixture will increase at increased pressure. Thus, in the hot filtration process described herein, the pressure throughout the filtration process (i.e., both upstream and downstream of the filter) is increased above atmospheric, and the filtration process is carried out at less than the boiling temperature of the mixture at the minimum pressure of the filtration process (e.g., the downstream pressure) and at greater than the minimum temperature at which the polymer is fully soluble in the solvent. The difference between the boiling temperature of the mixture at the minimum pressure of the filtration process and the minimum temperature at which the polymer is fully soluble in the solvent can provide a temperature range in which the filtration process can be carried out. For instance, the difference between these two temperatures can be about 10° C. or greater in some embodiments, or about 15° C. or greater in some embodiments, for example from about 10° C. to about 50° C. in some embodiments.

With reference to FIG. 1, the filtration process can include a filtration unit 100 in which the pressure downstream of the filter medium 110 (e.g., at the outlet as illustrated in FIG. 1) is such that the boiling temperature of the mixture at this downstream pressure is greater than the minimum temperature at which the polyarylene sulfide is fully soluble in the solvent. For instance, the downstream pressure can be greater than about 300 kilopascals (kPa). In some embodiments, the downstream pressure can be from about 300 kPa to about 1200 kPa, from about 400 kPa to about 1100 kPa, or from about 500 kPa to about 1000 kPa.

In addition to increased downstream pressure, the filtration process can be carried out so as to maintain a positive pressure differential across the filter medium 110 so as to provide a desired flow rate across the filter medium 110 and an efficient filtration process. For instance, the pressure difference across the filter medium 110 (e.g., from the inlet to the outlet as illustrated in FIG. 1) for at least a portion of the filtration process can be from about 30 kPa to about 500 kPa, from about 50 kPa to about 400 kPa, or from 70 kPa to about 300 kPa.

The mixture and filtrate can be heated throughout the filtration process so as to prevent precipitation of the polyarylene sulfide. For instance, the mixture and filtrate can be at a temperature of from about 220° C. to about 300° C. Moreover, the mixture and the filtrate can be at the same or different temperatures from one another. In addition, the filter unit 100 can be heated to a temperature at or near that of the mixture and/or the filtrate, so as to ensure the maintenance of the increased temperature of the materials and avoid undesirable precipitation of the polyarylene sulfide at any point within the filter unit, i.e., not only on the filter medium 110, but also throughout the unit 100. For instance, at least that portion of the filter unit 100 that will contact the mixture and the filtrate can be held at a temperature of between about 220° C. and about 300° C.

The upstream and downstream pressure as well as the pressure differential between the two can remain static or can vary throughout the filtration process as long as two basic criteria are met. These two criteria are 1) the downstream pressure is greater than the minimum pressure of the filtration process (i.e., that pressure at which the boiling temperature of the mixture at this downstream pressure is greater than the minimum temperature at which the polyarylene sulfide is fully soluble in the solvent) and 2) the upstream pressure is greater than the downstream pressure. Several exemplary embodiments of static and dynamic pressure systems that meet these basic criteria are described below.

According to one embodiment, the pressure differential across the filter medium 110 can be held constant throughout the filtration process to maintain a constant positive pressure throughout the filtration process. For instance, a constant pressure differentiation across the filter medium 110 can be from about 50 kPa to about 400 kPa. In one embodiment, the upstream pressure can be maintained at about 800 kPa and the downstream pressure can be maintained at about 550 kPa throughout the filtration process with a constant pressure differential of about 250 kPa throughout the filtration.

In one embodiment the pressure differential across the filter medium 110 can be held constant and at a maximum differential throughout the filtration process with the upstream pressure held at a maximum and the downstream pressure held at a minimum so as to maximize the flow rate of the filtration process. In general, the maximum allowable upstream pressure can be determined based upon the filter media utilized, the construction materials of the filter unit, and the pressurization capabilities of the system. The minimum allowable downstream pressure can be determined according to the lowest possible pressure at the operating temperature of the filtration process such that operating temperature is between the boiling temperature of the mixture at the downstream pressure and the temperature at which the polymer is fully soluble in the solvent.

The filtration process is not limited to those embodiments in which the upstream and downstream pressures are held static throughout the filtration, and the process can include dynamic upstream and/or downstream pressures. For instance, the downstream pressure can be controlled so as to maintain a positive pressure differential across the filter media and avoid precipitation of the polymer, while both the upstream pressure and the downstream pressure can decrease over the course of the filtration process. According to one embodiment, the pressure differential can remain constant throughout the process, while the upstream pressure and the downstream pressure vary at rates similar to one another. For instance, the upstream and downstream pressures can decrease linearly and at similar rates throughout the filtration process.

In a further embodiment, following a period of constant pressure differential between the upstream pressure and the downstream pressure, the filtration process can include a period of variable pressure differential between the upstream pressure and the downstream pressure. For instance, following a period of constant pressure differential while both the upstream pressure and the downstream pressure decline at a similar rate, the downstream pressure can reach the minimum allowable downstream pressure at which the boiling temperature of the mixture at the downstream pressure can be greater than the temperature at which the polyarylene sulfide is fully soluble in the solvent. At this point of the filtration process, the downstream pressure can be maintained at the minimum downstream pressure and the upstream pressure can continue to decline. The filtration process would then cease when the upstream pressure has declined to match the downstream pressure.

In yet another embodiment, the upstream or downstream pressure can be maintained at a constant pressure throughout the process and the corresponding downstream or upstream pressure can vary throughout the process. For instance, the downstream pressure can be held at the minimum downstream pressure throughout the filtration process and the upstream pressure can decrease at a linear rate from a maximum allowable upstream pressure to that point at which the upstream pressure meets the downstream pressure, at which point the filtration process would cease.

It should be understood that a dynamic filtration process is not in any way limited to either a decrease in upstream and/or downstream pressure throughout all of or a part of the filtration process or to a linear change in upstream pressure and/or downstream pressure throughout all of or a part of the process. For instance, in one embodiment, the upstream pressure can increase throughout the filtration process and counter the reduction in flow rate that can be caused due to the formation of the filter cake on the filter media. Moreover, the upstream pressure and/or downstream pressure can increase or decrease in a non-linear fashion, e.g., exponentially.

In general, the pressure control design of a filtration process can depend to a large extent upon the costs involved as both the equipment and operating costs can increase with increased operating temperatures and pressure. Thus, one desirable design can be at the lowest temperatures and pressures that allow the filtration process to be carried out while avoiding precipitation of the polyarylene sulfide. However, another desirable design can optimize flow rate through increased pressures and temperatures. In one embodiment, the system can include a mechanical stirrer that can agitate the filter cake during the filtration process (for instance to maintain desired pressure differentials across the filter medium) and/or during a filter cake wash (to improve contact between the filter cake and the wash fluid).

Beneficially, the filtration unit and filter medium used in the filtration process can include standard materials as are generally known in the art. For instance, filter media as is known in the art, wire sieves or sinter plates that are stable under the filtration process conditions can be used. The mesh sizes or pore sizes of the filter medium can be adjusted over a wide range and can vary depending on the filtration process conditions, e.g. viscosity of the mixture, filter pressure, temperature, on the desired degree of purity of the filtrate, etc. The technical equipment as can be used for the filtration process is known, for example simple pressure filters, agitated pressure filters, trailing blade centrifuges and rotary filters can be used, amongst others.

Following the filtration process, the filter cake can be washed to remove liquid of the filtered mixture that may remain in the filter cake. This liquid can include polyarylene sulfide in solution that can be recovered via the wash process and as such can increase the polymer yield of the formation process. For instance, the filter cake can be washed with solvent as is found in the mixture at a temperature at which the polymer will remain in solution. The resulting wash solution that can include dilute polymer can be combined with the filtrate of the filtration process. In one embodiment, the filter cake can be agitated during the wash to improve recovery of the polymer. The washed filter cake can be dried in one embodiment to recover adhering solvent residues. The final filter cake can include very little polyarylene sulfide. For instance, the final, dried filter cake can include less than about 1 wt. % of the solvent by weight of the filter cake and less than about 1 wt. % of the polyarylene sulfide by weight of the filter cake Following the wash, the salt cake can be removed from the filtration media and the filtration media can be re-used. For instance, the salt cake can be removed from the filtration media by use of a solids port in the system or by disassembly of the filtration unit. The salt cake can be removed from the filtration via mechanical means (e.g., a removal blade), by a pressure differential (e.g., across the filtration media so as to 'blow' the filter cake off of the media), or by some combination of methods. The salt cake can be removed in a dry or a wet state, as desired. For example, the solid salt cake can be combined with a liquid, e.g., water, optionally in conjunction with agitation, to form a slurry within the filtration unit that can then be removed, for instance via a solids port in the system, and disposed of in a suitable fashion, such as in a salt water body.

Following the first and second stages of the prepolymer formation and the filtration process, a third stage can be carried out during which a polymerization reaction takes place and the molecular weight of the polyarylene sulfide can be increased. During this polymerization step, water can be added to the filtrate so that the total amount of water in the polymerization system is about 2.5 moles or less per mole of the effective amount of the charged alkali metal sulfide. Following, the reaction mixture of the polymerization system can be heated to a temperature of from about 240° C. to about 290° C., from about 255° C. to about 280° C., or from about 260° C. to about 270° C. and the polymerization can continue until the melt viscosity of the thus formed polymer is raised to the desired final level. The duration of this polymerization step can be, e.g., from about 0.5 to about 20 hours, or from about 1 to about 10 hours. The weight average molecular weight of the formed polyarylene sulfide can vary as is known, but in one embodiment can be from about 1000 g/mol to about 500,000 g/mol, from about 2,000 g/mol to about 300,000 g/mol, or from about 3,000 g/mol to about 100,000 g/mol.

Following this polymerization reaction, a second filtration process can be carried out that can remove any additional salt from the product mixture, for instance any salt formed as the molecular weight of the prepolymer is increased during this polymerization. Alternatively, a filtration process can be carried out following this polymerization reaction and this can be the first filtration process of the system, i.e., there need not also be a filtration process between the first and second polymerization processes.

Following final polymerization, the polyarylene sulfide may be solidified (as desired) and discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

Following polymerization, the polyarylene sulfide may be washed with liquid media. For instance, the polyarylene sulfide may be washed with water, acetone, N-methyl-2-pyrrolidone, a salt solution, and/or an acidic media such as acetic acid or hydrochloric acid. The polyarylene sulfide can be washed in a sequential manner that is generally known to persons skilled in the art. The polyarylene sulfide can be subjected to a hot water washing process. The temperature of a hot water wash can be at or above about 100° C., for instance higher than about 120° C., higher than about 150° C., or higher than about 170° C. Generally, distilled water or deionized water can be used for hot water washing. In one embodiment, a hot water wash can be conducted by adding a predetermined amount of the polyarylene sulfide to a predetermined amount of water and heating the mixture under stirring in a pressure vessel. By way of example, a bath ratio of up to about 200 grams of polyarylene sulfide per liter of water can be used. Following the hot water wash, the polyarylene sulfide can be washed several times with warm water, maintained at a temperature of from about 10° C. to about 100° C. A wash can be carried out in an inert atmosphere to avoid deterioration of the polymer.

Organic solvents that will not decompose the polyarylene sulfide can be used for washing the polyarylene sulfide. Organic solvents can include, without limitation, nitrogen-containing polar solvents such as N-methylpyrrolidone, dimethylformamide, dimethylacetamide, 1,3-dimethylimidazolidinone, hexamethylphosporamide, and piperazinone; sulfoxide and sulfone solvents such as dimethyl sulfoxide, dimethylsulfone, and sulfolane; ketone solvents such as acetone, methyl ethyl ketone, diethyl ketone, and acetophenone, ether solvents such as diethyl ether, dipropyl ether, dioxane, and tetrahydrofuran; halogen-containing hydrocarbon solvents such as chloroform, methylene chloride, ethylene dichloride, trichloroethylene, perchloroethylene, monochloroethane, dichloroethane, tetrachloroethane, perchloroethane, and chlorobenzene; alcohol and phenol solvents such as methanol, ethanol, propanol, butanol, pentanol, ethylene glycol, propylene glycol, phenol, cresol, polyethylene glycol, and polypropylene glycol; and aromatic hydrocarbon solvents such as benzene, toluene, and xylene. Further, solvents can be used alone or as a mixture of two or more thereof.

Washing with an organic solvent can be carried out by immersing the polyarylene sulfide in the organic solvent and heating or stirring as appropriate. The washing temperature for the organic solvent washing is not particularly critical, and a temperature can generally be from about 20° C. to about 300° C. Washing efficiency can be increased with an elevation of the washing temperature, but in general, a satisfactory effect is obtained at a washing temperature of from about 20° C. to about 150° C.

In one embodiment, organic solvent washing can be combined with hot water washing and/or warm water washing. When a high-boiling-point organic solvent such as N-methylpyrrolidone is used, the residual organic solvent can be removed by washing with water or warm water after the organic solvent washing, and distilled water or deionized water can be used for this washing.

The polyarylene sulfide can be utilized in forming products as are generally known in the art. For instance, the polyarylene sulfide can be combined with additives such as one or more of fillers (e.g., fibers and/or particulate fillers), coupling agents, an impact modifier, antimicrobials, pigments, lubricants, antioxidants, stabilizers, surfactants, waxes, flow promoters, solid solvents, and other materials added to enhance properties and processability. Such optional materials may be employed in mixture in conventional amounts.

A mixture that is melt processed to form a melt processed polyarylene sulfide composition may include a polyarylene sulfide (or a blend of multiple polyarylene sulfides) in an amount from about 40 wt. % to about 90 wt. % by weight of the mixture, for instance from about 45% wt. % to about 80 wt. % by weight of the mixture.

The polyarylene sulfide may be melt processed according to techniques known in the art. For example, the polyarylene sulfide may be melt-kneaded in conjunction with one or more additives in a single-screw or multi-screw extruder at a temperature of from about 250° C. to about 320° C. In one embodiment, the polyarylene sulfide may be melt processed in an extruder that includes multiple temperature zones. For instance, the polyarylene sulfide may be melt processed in an extruder that includes a temperature zone that is maintained at a temperature of between about 250° C. and about 320° C.

Conventional shaping processes for forming articles including the polyarylene sulfide may be used. For instance, extrusion, injection molding, blow-molding, thermoforming, foaming, compression molding, hot-stamping, fiber spinning and so forth can be used.

Shaped articles that may be formed including the polyarylene sulfide may include structural and non-structural shaped parts, for instance for appliances, electrical materials, electronic products, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, and pond liners, to name a few. Other useful articles besides moldings, extrusion and fibers include wall panels, overhead storage lockers, serving trays, seat backs, cabin partitions, window covers, and electronic packaging handling systems such as integrated circuit trays.

A composition including the polyarylene sulfide can be used in a variety of electrical and electronic applications such as, for example, connectors and over-molding (insert-molding) parts is encompassed.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Example

A 2 liter titanium pressure reactor was charged with 443.7 g of NMP, 20.3 g of $H_2O$ and 84.9 g of NaOH (96.4%). The reactor was sealed and heated to 100° C. To this mixture (SMAB-NaSH mixture) was added molten 155.86 grams of NaSH (containing 71.4% NaSH and 0.7% $Na_2S$). The reactor was heated to 205° C. and 75 ml of distillate containing water and NMP was collected.

To this SMAB-NaSH mixture was added a pre-heated mixture of para-dichlorobenzene (p-DCB) in NMP (74% solution by weight). The reactor was sealed and the temperature allowed to rise to 235° C. and held for 1 hour. The temperature was then increased to 245° C. and held for another 3 hours for formation of the prepolymer.

Following formation of the prepolymer, the reactor was maintained at 350 kPa and a filtration process as described herein utilizing a 1 L Mott filter was carried out to remove the salt byproduct. The filtration process started at 235° C. Filtration rates were 3000-5000 $l/m^2h$ after the filter cake had built up to about 300 mm height. The filtrate was collected in a stirred pressure vessel that was heated to 240° C., in order to keep the prepolymer in solution. The upstream side of the filter was held at 90 pounds per square inch gauge (115 psia, 790 kPa) and 235° C. and the filtrate side was held at atmospheric pressure (no backpressure 14.7 psia, 101 kPa) and about 200° C.

The salt filter cake was washed thrice with 300 grams of NMP, which was preheated to at least 230° C. in the polymerization reactor. The wash filtrates rich in PPS were added to the first filtrate.

The filter cake was flushed with dry nitrogen, in order to pre-dry the sodium chloride. It turned out that residual moisture of less than 10 weight percent was achievable within 10-15 minutes of $N_2$ flushing. This result was reached without any mechanical means to mix or move the filter cake, just by pressing nitrogen through the cake from the pressure side to the filtrate side. The resulting salt filter cake was a powdery, non-sticky product that allowed easy solid handling. The sodium chloride particle size ranged from 20-60 microns in size. The prepolymer-containing filtrate was transferred into the polymerization reactor for further polymerization. The final stage of the polymerization was conducted by concentrating the filtrate to 20% solids by means of a flash distillation at 235° C. to remove all unreacted pDCB, $H_2O$ byproduct, excess NMP and other volatiles. Following, a sulfide correction was added (to increase the melt viscosity of the polymer from <1 Poise to a final melt viscosity of 460 Poise). The polymerization was conducted by heating the reactor to 245° C. and holding the temperature for 1 hour then raising the temperature to 260° C. and holding it for 3 hours. After the hold time, 90 grams of water was added via a pump and the pressure of the reactor was increased from 100 psi up to 270 psi. After the addition, the temperature was allowed to cool down to obtain a granular PPS polymer. To isolate the PPS, the slurry was filtered and washed with once with 1 L NMP followed by 1 L of 3% acetic acid in water at 60° C. then 3 times with 80° C. water. The washed polymer was dried at 104° C. vacuum oven. The yield was 200 g (93% of theory).

Figure 2:
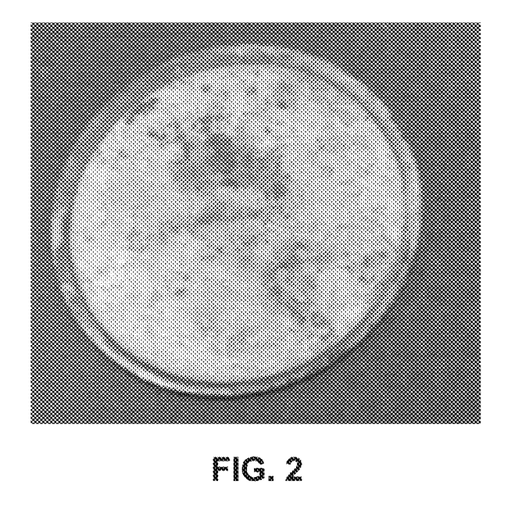
FIG. 2 illustrates filter media following a salt byproduct separation process with atmospheric downstream pressure during the filtration.

The filter media following the filtration for this run is illustrated in FIG. 2. In this sample, the downstream pressure (atmospheric) corresponded to a boiling temperature for the filtrate that was lower than the temperature at which the polyphenylene sulfide was fully soluble in the NMP. This caused the polyphenylene sulfide to precipitate and plug the filter, as can be seen in FIG. 2.

Example 2

Figure 3:
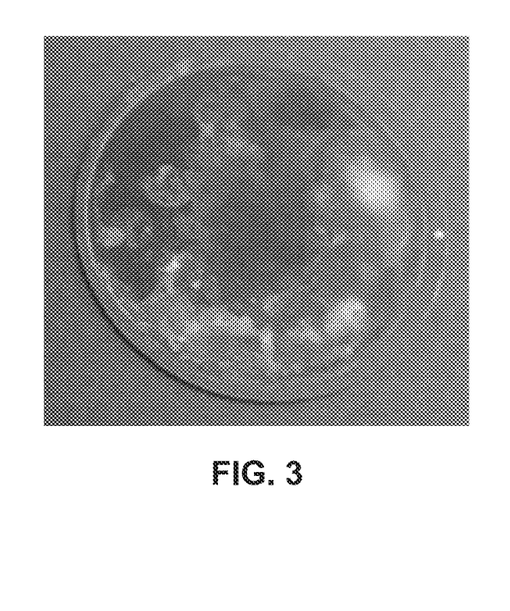
FIG. 3 illustrates filter media following a salt byproduct separation process in which the downstream pressure was maintained such that the boiling temperature of the filtrate at the downstream pressure was greater than the temperature at which the polyarylene sulfide polymer was fully soluble in the solvent.

The process of Example 1 was repeated, but in this Example, the upstream side of the filter was held at 90 pounds per square inch gauge (115 psia, 790 kPa) and 235° C. and the filtrate side was held at 65 pounds per square inch gauge (80 psia, 550 kPa) and 235° C. The filter media following the filtration for this run is illustrated in FIG. 3. In this sample, the downstream pressure corresponded to a boiling temperature for the filtrate that was higher than the temperature at which the polyphenylene sulfide was fully soluble in the NMP. As such, there was no precipitation or plugging of the filter, as can be seen in FIG. 3.

While certain representative embodiments and details have been shown for the purpose of illustrating the subject invention, it will be apparent to those skilled in this art that various changes and modifications may be made therein without departing from the scope of the subject invention.

What is claimed is:

1. A system for forming a polyarylene sulfide comprising:
    a first polymerization reactor in which a dihaloaromatic compound is capable of being reacted with an alkali metal sulfide or an alkali metal hydrosulfide in an organic amide solvent to form a mixture that includes a polyarylene sulfide and a salt;
    a filter unit that is located downstream from the first polymerization reactor and configured to separate the mixture into a filter cake and a filtrate, wherein the filtrate contains at least a portion of the polyarylene sulfide and the filter cake contains at least a portion of the salt; and
    a second polymerization reactor located downstream from the filter unit and in which the polyarylene sulfide from the filtrate is capable of being reacted with an alkali metal sulfide or hydrosulfide.

2. The system of claim 1, further comprising an additional reactor upstream of the filter unit.

3. The system of claim 1, wherein at least a portion of the filter unit is heated.

4. The system of claim 3, wherein at least that portion of the filter unit that contacts the mixture and the filtrate is heated.

5. The system of claim 1, wherein the filter unit is maintained at a pressure that is elevated above atmospheric pressure and at a temperature of from about 220° C. to about 300° C.

6. The system of claim 5, wherein the elevated pressure is about 300 kilopascals or more.

7. The system of claim 5, wherein the elevated pressure is constant.

8. The system of claim 1, wherein the pressure upstream of the filter unit is greater than the pressure downstream of the filter.

9. The method of claim 8, wherein the downstream pressure is about 300 kilopascals or more.

10. The method of claim 8, wherein the difference between the upstream pressure and the downstream pressure is constant.

11. The method of claim 8, wherein the upstream pressure and downstream pressure are constant.

12. The system of claim 1, further comprising an additional filter unit that is located downstream from the second polymerization reactor.

\* \* \* \* \*